United States Patent Office 3,631,137
Patented Dec. 28, 1971

3,631,137
POLYEPOXIDES CONTAINING AMIDE DILUENTS
Kevin Kromer Kipp, Cleveland, Ohio, assignor to The
Lubrizol Corporation, Wickliffe, Ohio
No Drawing. Filed Mar. 27, 1970, Ser. No. 23,497
Int. Cl. C08g 51/26, 51/44
U.S. Cl. 260—30.4 EP    10 Claims

ABSTRACT OF THE DISCLOSURE

Various N-oxoalkyl and N-hydroxyalkyl amides, especially diacetone acrylamide and compounds derived therefrom, reduce the viscosity of epoxy resins. The physical properties of the resins, both before and after curing, are not substantially damaged by the addition of such diluents.

This invention relates to epoxy resin compositions, and more particularly to compositions comprising a major amount of a polyepoxide containing more than one vic-epoxy group, and a minor amount, sufficient to reduce the viscosity thereof, of a compound of the formula $$R^1-Z-\underset{\underset{R^3}{|}}{\overset{\overset{R^2}{|}}{C}}-\underset{\underset{R^5}{|}}{\overset{\overset{R^4}{|}}{C}}-\underset{\underset{H}{|}}{N}-\overset{\overset{O}{\|}}{C}-Y$$

wherein:
Y is lower alkyl,

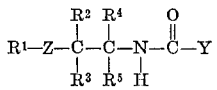

Z is

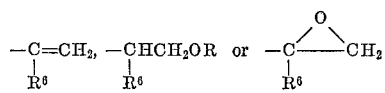

each of R, $R^4$ and $R^5$ is hydrogen or a hydrocarbon radical;
each of $R^1$, $R^2$, and $R^3$ is hydrogen, a hydrocarbon radical radical or a hydroxyalkyl or alkoxyalkyl radical; and
$R^6$ is hydrogen or a lower alkyl radical.

Polyepoxides, such as those obtained by reacting epichlorohydrin with polyhydric phenols in the presence of caustic, are widely used in preparing industrial products as they may be cured to resins which are very hard and durable and have good resistance to chemicals. However, they have some undesirable properties; for example, they are generally thick liquids or solids and are therefore difficult to utilize in that form for many applications, such as in the preparation of surfacing compositions, castings, impregnating and sealing compositions and the like. To correct this defect, the resins are frequently combined with inert diluents, generally liquids such as dibutyl phthalate, or with reactive diluents, such as butyl glycidyl ether. It is important that such a diluent be one which does not have serious adverse effects on the properties of the resin, such as the heat distortion temperature, tensile strength and the like.

A principal object of this invention, therefore, is to produce improved epoxy resin compositions characterized by low viscosity.

A further object is to provide a method for increasing the fluidity of epoxy resins while at the same time preserving the desirable properties of the resins.

A further object is to provide fluid epoxy resin compositions which can be cured to form products having excellent properties.

Other objects will in part be obvious and will in part appear hereinafter.

As used in the above formula and elsewhere herein, the term "hydrocarbon radical" includes aliphatic, cycloaliphatic and aromatic (including aliphatic-substituted aromatic and aromatic-substituted aliphatic) radicals. Substituted hydrocarbon, alkyl, aryl, etc., radicals are considered to be fully equivalent to the hydrocarbon, alkyl, aryl, etc., radicals and to be part of this invention. By "substituted" is particularly meant radicals containing relatively inert substituents such as ether (especially lower alkoxy), ester (especially lower carbalkoxy), keto, nitro, halogen and the like so long as these substituents do not alter significantly the character or reactivity of the radical. In general, no more than about three such substituent groups will be present for each 10 carbon atoms in the radical.

The following are illustrative of hydrocarbon and substituted hydrocarbon radicals within the scope of this invention.

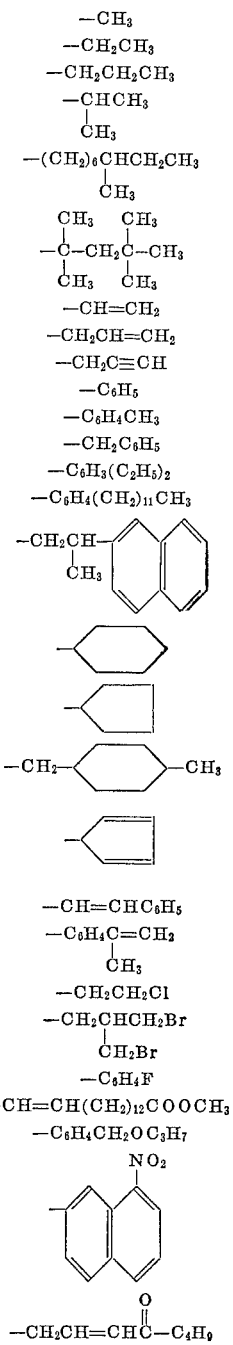

Preferably, the hydrocarbon or substituted hydrocarbon radicals in the compounds used in the compositions of this invention are lower hydrocarbon radicals, the word "lower" denoting radicals containing no more than about 12 carbon atoms. Still more preferably, they are lower alkyl or aryl radicals, most often alkyl. In the most preferred compounds, R is lower alkyl; $R^1$ is lower alkyl (usually) or a radical of the formula $$R^7O—R^8—CH_2—$$

wherein $R^7$ is hydrogen or lower alkyl and $R^8$ is a divalent hydrocarbon atom having less than five carbon atoms, usually methylene; each of $R^2$ and $R^3$ is hydrogen (usually) or $R^7O—R^8—$; $R^4$ and $R^5$ are lower alkyl; and $R^6$ is hydrogen or methyl. Especially useful are compounds of the formula

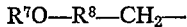

wherein $R^{1-6}$ are as defined above, particularly those in which $R^1$, $R^4$ and $R^5$ are lower alkyl and $R^2$, $R^3$ and $R^6$ are hydrogen.

The following compounds are illustrative of the diluents which may be used in the compositions of this invention.

N—(1,1-Dimethyl-3-oxobutyl)acetamide

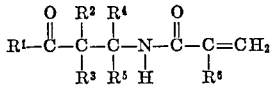

N—(1,1-Dimethyl-3-oxobutyl)acrylamide (diacetone acrylamide)

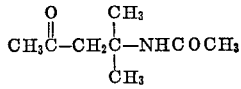

N—(1,1-Dimethyl-3-oxobutyl)-3-methoxypropionamide

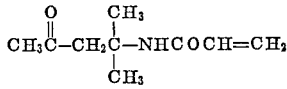

N—(1,3-Diphenyl-1-methyl-3-oxopropyl)methacrylamide

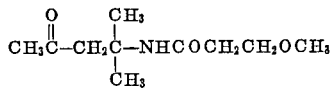

N—(1,1-Dimethyl-3-oxobutyl)-2,3-epoxypropionamide

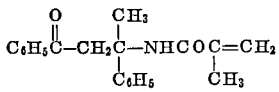

N—[1,1-Dimethyl-2,2,4-tris(hydroxymethyl)-3-oxobutyl]acrylamide

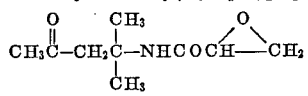

N—[1,1-Dimethyl-2,2,4-tris(n-butoxymethyl)-3-oxobutyl]acrylamide

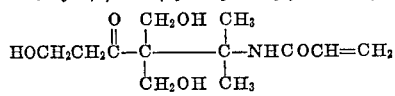

N—(1,1-Dimethyl-3-hydroxybutyl)acrylamide

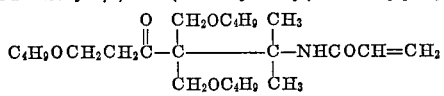

N—(1,2-Dimethyl-3-hydroxypentyl)butyramide

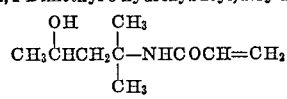

N—(1,1-Dimethyl-3-hydroxybutyl)-3-methoxypropionamide

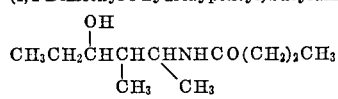

N—[1,3-Di-(p-nitrophenyl)-2-n-pentyl-3-hydroxybutyl]-3-n-propoxypropionamide

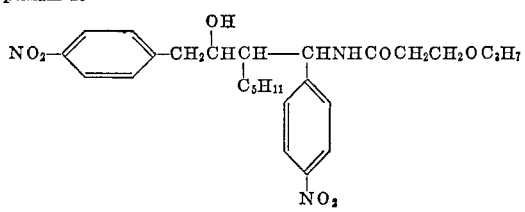

The preparation of compounds of this type wherein Z is

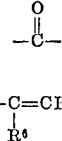

Y is

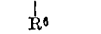

and $R^{1-3}$ are hydrogen or hydrocarbon radicals is described in U.S. Pats. 3,277,056 and 3,425,942, the disclosures of which are incorporated by reference herein. Similar compounds wherein one or more of $R^{1-3}$ are hydroxyalkyl or alkoxyalkyl radicals are disclosed in copending application Ser. No. 833,162, filed June 13, 1969. Compounds wherein Y is

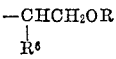

are disclosed in copending application Ser. No. 747,774, filed July 17, 1968, now Pat. No. 3,525,768 and those wherein Z is

are disclosed in copending application Ser. No. 788,819, now Pat. No. 3,531,525 filed Jan. 3, 1969. Epoxy compounds (wherein Y is

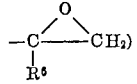

are disclosed in copending application Ser. No. 23,498, filed Mar. 27, 1970.

The polyepoxides used in the compositions of this invention include those compounds having more than one vic-epoxy group. These polyepoxides may be saturated or unsaturated, aliphatic, cycloaliphatic, aromatic or heterocyclic and may be substituted if desired with non-interfering substituents, such as halogen atoms, hydroxyl groups, ether radicals and the like. They may also be monomeric or polymeric. The following are illustrative of suitable polyepoxides.

(I) MONOMERIC POLYEPOXIDES (1) Polyepoxy hydrocarbons such as butadiene dioxide, epoxidized 2,2 - bis(2-cyclohexenyl)propane, epoxidized vinylcyclohexene, epoxidized dicyclopentadiene, 1,2,5,6-diepoxy-3-hexyne, and 1,2,5,6-diepoxyhexane.

(2) Epoxy ethers such as 1,4-bis(2,3-epoxypropoxy)-benzene, 1,3-bis(2,3-epoxypropoxy)benzene, 4,4'-bis(2,3-epoxypropoxy)diphenyl ether, 1,8 - bis(2,3 - epoxypropoxy)octane, 1,4 - bis(2,3 - epoxypropoxy)cyclohexane, 4,4' - bis(2 - hydroxy - 3,4 - epoxybutoxy)diphenyldimethylmethane, 1,3 - bis(4,5 - epoxypentoxy) - 5-chlorobenzene, 1,4 - bis(3,4 - epoxybutoxy) - 2 - chlorocyclohexane, diglycidyl ether, 1,3 - bis(2 - hydroxy - 3,4 - epoxybutoxy)benzene, 1,4 - bis(2 - hydroxy - 4,5-epoxypentoxy)benzene, and 1,2,3,4-tetra(2-hydroxy-3,4-epoxybutoxy)butane.

(3) Epoxidized esters of polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean, sunflower, rapeseed, hempseed, sardine and cottonseed oil.

(4) Epoxidized esters of unsaturated monohydric alcohols and polycarboxylic acids, such as di-(2,3-epoxybutyl) adipate, di-(2,3-epoxybutyl) oxalate, di-(2,3-epoxyhexyl) succinate, di-(3,4-epoxybutyl) maleate, di-(2,3-epoxyoctyl) pimelate, di-(2,3-epoxybutyl) phthalate, di-(2,3 - epoxyoctyl) tetrahydrophthalate, di-(4,5 - epoxydodecyl)maleate, di-(2,3-epoxybutyl) terephthalate, di-(2,3 - epoxypentyl) thiodipropionate, di-(5,6 - epoxytetradecyl) diphenyldicarboxylate, di-(3,4 - epoxyheptyl) sulfonyldibutyrate, tri-(2,3 - epoxybutyl) 1,2,4 - butanetricarboxylate, di-(5,6 - epoxypentadecyl) tartrate, di-(4,5 - epoxytetradecyl) maleate, di-(2,3 - epoxybutyl) azelate, di-(3,4 - epoxybutyl) citrate, di-(5,6-epoxyoctyl) cyclohexane - 1,3 - dicarboxylate, and di-(4,5-epoxyoctadecyl) malonate.

(5) Epoxidized esters of unsaturated alcohols and unsaturated carboxylic acids, such as 2,3 - epoxybutyl 3,4-epoxypentenoate, 3,4 - epoxyhexyl 3,4 - epoxypentenoate, 3,4 - epoxycyclohexyl 3,4 - epoxycyclohexanoate, 3,4-epoxycyclohexyl 4,5 - epoxyoctanoate, and 2,3 - epoxycyclohexylmethyl epoxycyclohexanecarboxylate.

(6) Epoxidized derivatives of polyethylenically unsaturated polycarboxylic acids such as dimethyl 8,9,12,13-diepoxyeicosanedioate, dibutyl 7,8,11,12-diepoxyoctadecanedioate, dioctyl 10,11 - diethyl - 8,9,12,13-diepoxyeicosanedioate, dihexyl 6,7,10,11 - diepoxyhexadecanedioate, didecyl 9 - epoxyethyl - 10,11 - epoxyoctadecenedioate, dibutyl 3 - butyl - 3,4,5,6 - diepoxycyclohexane-1,2-dicarboxylate, dicyclohexyl 3,4,5,6 - diepoxycycloxexane-1,2 - dicarboxylate, dibenzyl 1,2,4,5 - diepoxycyclohexane-1,2 - dicarboxylate, and diethyl 5,6,10,11 - diepoxyoctadecylsuccinate.

(7) Glycidyl polyethers of the polyhydric phenols, obtained by reacting a polyhydric phenol with a great excess of a halogen-containing epoxide in an alkaline medium. For example, bisphenol A[2,2-bis(4-hydroxyphenyl)propane] may be reacted with an excess of epichlorohydrin to form 2,2-bis(2,3-epoxypropoxyphenyl) propane. Other polyhydric phenols that can be used for this purpose include resorcinol, catechol, hydroquinone, methyl resorcinol, 2,2 - bis(4 - hydroxyphenyl)butane, 4,4' - dihydroxybenzophenone, bis-(4 - hydroxyphenyl) ethane, and 1,5 - dihydroxynaphthalene. Other halogen-containing epoxides which may be used include 3-chloro-1,2 - epoxybutane, 3 - bromo - 1,3-epoxyhexane, and 3-chloro-1,2-epoxyoctane.

(II) POLYMERIC EPOXIDES (8) Polyepoxypolyhydroxy polyethers obtained by reacting, preferably in an acidic or alkaline medium, a polyhydric alcohol or polyhydric phenol with a polyepoxide, such as the reaction product of glycerol and bis(2,3 - epoxypropyl) ether, the reaction product of sorbitol and bis-(2,3 - epoxy - 2 - methoylpropyl) ether, the reaction product of pentaerythritol and 1,2,4,5-diepoxypentane, the reaction product of bisphenol A and bis(2,3 - epoxy - 2 - methylpropyl) ether, the reaction product of resorcinol and bis-(2,3-epoxypropyl) ether, and the reaction product of catechol and bis-(2,3-epoxypropyl) ether.

(9) Polyepoxy polyethers obtained by reacting, preferably in the presence of an acidic compound such as hydrofluoric acid, a halogen-containing epoxide with a polyhydric alcohol such as glycerol, propylene glycol, ethylene glycol, trimethylene glycol, butylene glycol and the like, and subsequently treating the resulting product with an alkaline reagent.

(10) Epoxy derivatives of polyesters obtained by reacting an unsaturated polyhydric alcohol with an unsaturated polycarboxylic acid or anhydride, such as the polyester formed by reacting 8,9,12,13-eicosadienedioic acid with ethylene glycol, the polyester obtained by reacting diethylene glycol with 2 - cyclohexene - 1,4-dicarboxylic acid, and the like.

(11) Epoxidized polymers and copolymers of diolefins, such as polybutadiene, butadiene-acrylonitrile copolymers, butadiene-styrene copolymers and the like.

(12) Hydroxy-substituted polyepoxy polyethers obtained by reacting, preferably in an alkaline medium, a slight excess of a halogen-containing epoxide with any of the polyhydric phenols described above.

(13) Glycidyl ethers of the novolar resins obtained by condensing an aldehyde with a phenol.

(14) Polymers and copolymers of epoxy-containing monomers possessing at least one polymerizable ethylenic linkage. When this type of monomer is polymerized in the substantial absence of alkaline or acidic catalysts but in the presence of a free radical catalyst, actinic light or the like, they undergo addition polymerization at the ethylenic bond leaving the epoxy group unaffected. These monomers may be polymerized with themselves or with other ethylenically unstaurated monomers, such as styrene, vinyl acetate, acrylonitrile, methacrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative polymers include poly(allyl 2,3-epoxypropyl ether), poly(2,3-epoxypropyl crotonate), the copolymer of styrene with allyl 2,3-epoxypropyl ether, the copolymer of allyl benzoate with methallyl 3,4-epoxybutyl ether, poly-(vinyl 2,3-epoxypropyl ether), the copolymer of vinyl acetate with allyl glycidyl ether, and poly-(4-glycidyloxystyrene).

Particularly preferred for use as epoxy-containing compounds in the compositions of this invention are the so-called ethoxyline resins, which are obtained by condensing polyhydric phenols with epichlorohydrin.

The compositions of this invention are ordinarily prepared by merely mixing the two ingredients together, especially if both components are liquids. If the polyepoxide is a thick liquid or solid, it is generally preferred to heat before or during the mixing. Various solvents or diluents which will evaporate before or during cure may be added to assist in the preparation, but the addition of these materials is not generally desirable as it usually lengthens the curing time. Some of the diluents used in the compositions of this invention, especially diacetone acrylamide, are solids rather than liquids. It is frequently more convenient to measure a solid than a liquid into a relatively mobile liquid polyepoxide.

The ratio of the polyepoxide to the diluent will vary depending on the properties desired in the products. In general, about 0.1–25 parts of the diluent are used per 100 parts of polyepoxide compound, but greater or lesser quantities may be used in certain instances. The preferred range is about 0.1–10 parts of diluent per 100 parts of polyepoxide. Other materials, such as fillers, dyes, plasticizers, stabilizers and the like may be added as desired, along with suitable other resinous materials such as vinyl resins, tars, pitches, distillate oil, alkyd resins and the like.

The compositions of this invention may be cured by the action of a curing or hardening agent. Many types of such curing agents are known in the art; they may be acidic, neutral or alkaline. Examples are:

(A) Alkalies and alkaline salts such as sodium hydroxide, potassium hydroxide and sodium phenoxide.

(B) Carboxylic acids or anhydrides such as phthalic anhydride, tetrahydrophthalic anhydride, dimer or trimer acids derived from unsaturated fatty acids, 1,20-eicosanedioic acid and the like.

(C) Friedel-Crafts metal halides such as aluminum chloride, zinc chloride or ferric chloride.

(D) Salts such as zinc fluoborate, magnesium perchlorate or zinc fluosilicate.

(E) Phosphoric acid and partial esters thereof including n-butyl orthophosphate, diethyl orthophosphate and hexaethyl tetraphosphate.

(F) Amino compounds and their salts and derivatives, including diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3 - propanediamine, N,N - diethyl - 1,3 - propanediamine, 1,2 - diamino - 2 - methylpropane, 2,3 - diamino-2 - methylbutane, 2,4 - diamino - 2 - methylpentane, 2,4-diamino - 2,6 - diethyloctane, dibutylamine, dioctylamine, dinonylamine, distearylamine, diallylamine, dicyclohexylamine, methylethylamine, ethylcyclohexylamine, pyrrolidine, 2 - methylpyrrolidine, tetrahydropyridine, 2,6 - diaminopyridine, m-phenylenediamine and the like; soluble adducts of amines and polyepoxides and their salts; and addition products of N-3-oxohydrocarbon-substituted acrylamides (e.g., diacetone acrylamide) with amines, especially polyamines such as ethylene diamine and diethylene triamine.

(G) Polyamides such as isophthalamide and amino amides obtained by reacting polybasic acids with polyamines such as diethylene triamine; or addition products of such polyamides with N-3-oxohydrocarbon-substituted acrylamides such as diacetone acrylamide.

The effectiveness of the diluents in the compositions of this invention is shown by an experiment in which a commercial epoxy resin prepared from bisphenol A and epichlorohydrin and having an epoxide equivalent weight of 175–195 is diluted with various amounts of the diluents according to the above formula. The following table lists Brookfield viscosity ( 2 r.p.m., 77° F.) and various physical properties determined on a ⅛-inch thick casting prepared between cellophane coated glass plates from the compositions of this invention cured with 10 phr. of diethylene triamine and aged for two weeks.

Z is

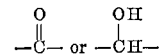

each of R, $R^4$ and $R^5$ is hydrogen or a hydrocarbon radical;
each of $R^1$, $R^2$ and $R^3$ is hydrogen, a hydrocarbon radical or a hydroxyalkyl or alkoxyalkyl radical; and
$R^6$ is hydrogen or a lower alkyl radical.

2. A composition according to claim 1 wherein the viscosity-reducing compound has the formula

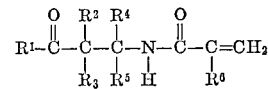

wherein each of $R^1$, $R^2$, $R^3$, $R^4$ and $R^5$ is hydrogen or a hydrocarbon radical.

3. A composition according to claim 2 wherein the polyepoxide is an epoxy resin obtained by condensing a polyhydric phenol with epichlorohydrin.

4. A composition according to claim 3 wherein the polyhydric phenol is bisphenol A.

5. A composition according to claim 4 wherein $R^1$, $R^4$ and $R^5$ are lower alkyl radicals and $R^2$, $R^3$, and $R^6$ are hydrogen.

6. A composition according to claim 5 wherein the viscosity-reducing compound is N-(1,1-dimethyl-3-oxobutyl)acrylamide.

7. An insoluble, infusible product obtained by reacting the composition of claim 1 with a curing agent for an epoxy resin.

8. An insoluble, infusible product obtained by reacting the composition of claim 2 with a curing agent for an epoxy resin.

9. An insoluble, infusible product obtained by reacting

| Diluent | Concentration, phr. | Brookfield viscosity, cp. | Tensile strength, p.s.i. | Flexural modulus, p.s.i. | Flexural strength, p.s.i. | Izod impact strength, ft.-lb./in. |
|---|---|---|---|---|---|---|
| None (control) | | 18,400 | 11,700 | 19,700 | 5.10×10⁵ | 0.47 |
| Diacetone acrylamide | 1.0 | 8,800 | | | | |
| | 2.5 | 8,800 | | | | |
| | 5.0 | 7,700 | | | | |
| | 7.5 | 5,000 | | | | |
| | 10.0 | 5,200 | 12,400 | 19,500 | 5.1×10⁵ | 0.05 |
| N-(1,1-Dimethyl-3-hydroxybutyl)-3-methoxypropionamide | 1.0 | 11,000 | | | | |
| | 2.5 | 9,200 | | | | |
| | 5.0 | 7,000 | | | | |
| | 7.5 | 5,600 | | | | |
| | 10.0 | 4,600 | 12,000 | 17,500 | 5.27×10⁵ | 0.50 |
| N-(1,1-Dimethyl-3-oxobutyl)-3-methoxypropoxamide | 1.0 | 12,600 | | | | |
| | 2.5 | 9,200 | | | | |
| | 5.0 | 6,600 | | | | |
| | 7.5 | 5,000 | | | | |
| | 10.0 | 3,900 | 11,700 | 18,400 | 5.1×10⁵ | 0.27 |
| N-(1,1-Dimethyl-3-oxobutyl)-2,3-epoxypropionamide | 1.0 | 12,800 | | | | |
| | 2.5 | 10,600 | | | | |
| | 5.0 | 8,600 | | | | |
| | 7.5 | 6,800 | | | | |
| | 10.0 | 6,000 | 10,700 | 16,100 | 5.66×10⁵ | 0.3 |

What is claimed is:

1. A composition comprising a major amount of a polyepoxide containing more than one vic-epoxy group, and a minor amount, sufficient to reduce the viscosity thereof, of a compound of the formula

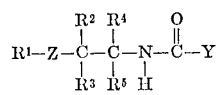

wherein:
Y is lower alkyl,

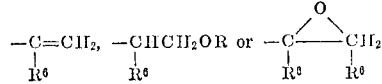

the composition of claim 4 with a curing agent for an epoxy resin.

10. An insoluble, infusible product obtained by reacting the composition of claim 6 with a curing agent for an epoxy resin.

References Cited
UNITED STATES PATENTS 3,232,901  2/1966  Holm et al. _____ 260—30.4 EP
3,305,514  2/1967  Tiffan et al. _____ 260—32.6

MORRIS LIEBMAN, Primary Examiner
L. T. JACOBS, Assistant Examiner

U.S. Cl. X.R.
260—32.6